United States Patent Office 3,501,333
Patented Mar. 17, 1970

3,501,333
ALUMINUM COATING OF PARTICULATE
SUBSTRATE MATERIALS
Kenneth O. Groves, Midland, and Reinhold Hellmann, Coleman, Mich., assignors to The Dow Chemical Company, Midland, Mich., a corporation of Delaware
No Drawing. Filed Sept. 14, 1967, Ser. No. 667,643
Int. Cl. B44d 1/02, 1/46
U.S. Cl. 117—47          13 Claims

ABSTRACT OF THE DISCLOSURE

A method for coating particulate substrate materials with aluminum which comprises: agitating a body of individual particles in a solution containing a transition metal catalyst; drying the particles; agitating the catalyst coated body of particles in a solution containing an aluminum hydride compound; removing the particles from the aluminum hydride solution, and heating the particles to a sufficient temperature to decompose the aluminum hydride compound and deposit an aluminum coat on the surface of the individual particulate substrate materials.

Background of the invention

Metal coatings, in particular aluminum coatings, are desired on various particulate materials for a variety of reasons. They may be required for decorative purposes, strengthening purposes and other like purposes. In particular individual elongated acicular crystalline materials, commonly known as "whiskers," are receiving considerable attention as strengthening components of structural compositions. In such applications, the "whiskers" usually are bound together with a continuous media termed a matrix.

In general, it is usually preferable to provide a metal coating on the "whiskers" for one or more of the following reasons: (i) to promote wetting of the "whisker" and/or the matrix when used in structural applications; (ii) to promote the development of high interface shear strengths; (iii) to provide a diffusion barrier at high temperatures to prevent, (a) dissolution of "whiskers" in the matrix, (b) recrystallization and weakening of "whiskers," or (c) formation of brittle intermetallic or other interfacial compounds; (iv) to assure separation of the "whiskers" in the matrix and (v) to protect the "whiskers" during handling and in the preparation of the structural bodies, etc. Likewise microspheres and microballoons, such as those described in U.S. Patent No. 3,030,215 and constructed of various materials such as, for example, glass, are receiving attention for use as strengthening components, filter aids, insulating materials, and other like applications. Coatings on these microspheres and balloons are important for the same reasons as previously indicated for the whiskers.

Several coating techniques, e.g., vapor deposition and electroless nickel plating are presently being used for coating various individual particles. The principal problem in the plating of particles, and especially "whiskers" by these known methods is in achieving a uniform exposure of each small particle to the plating media, i.e., metal vapors or a solution capable of electroless plating, e.g., nickel, copper, etc. The particles tend to form clusters, the interiors of which are very difficult to reach with the metallizing mediums and methods presently being employed. Even when the particles are agitated when employing one of these conventional plating techniques, the problems heretofore encountered are not completely eliminated. Therefore, non-uniform coatings with undesirable brittle protrusions are formed on the individual particles.

The present invention concerns a novel method for depositing metallic aluminum onto the surface of individual particulate substrate materials. A principal advantage of this method is that the actual deposition of aluminum as a coat on the individual substrate material is rigidly controlled, thus producing a substantially continuous, uniform and adherent coating with little tendency to form brittle protrusions of aluminum from the individual particle surfaces.

Summary of the invention

The present invention concerns a method of coating aluminum onto the surface of individual particulate substrates and comprises agitating a body of individual particles in a solution containing a transition metal compound catalyst wherein the metal cation is selected from Groups IVb and Vb of the periodic table. The particles are agitated in the catalytic solution to break down and minimize cluster formations and to assure that the entire surface of all the particles is coated with the catalytic solution. The catalyst coated particles are dried at a sufficient temperature and for a sufficient period of time to remove excess catalyst solution. The catalyst-coated particles are then agitated in an aluminum hydride compound solution for a sufficient period of time to break down substantially all of the clusters and to assure that the entire surface of the individual particles is exposed to the solution. The so-treated particles are separated from the aluminum hydride compound solution, usually by filtering, and dried (e.g. air dried) and heated at a sufficient temperature to decompose the aluminum hydride and effect the plating of aluminum in the form of an adherent, substantially uniform and continuous metallic coating on the surface of the individual particles.

An advantage of the process is that by first contacting the particles with the transition metal catalyst, in particular compounds of the metals occurring in Groups IVb and Vb of the Periodic Table, the subsequent decomposition of aluminum hydride compounds on the particle surfaces to produce a plating of metallic aluminum can be carried out at temperatures below the decomposition temperature of the hydrides. Further, the use of such catalysts and agitation permits a uniform and continuous coating of metallic aluminum to be deposited on the entire surface of the individual particulate substrates.

Preferred embodiment

Usually, in practice a body of particles e.g. whiskers, glass microballoons, and the like, to be coated is dispersed in a solution containing a transition metal compound catalyst wherein the metal cation is selected from Groups IVb and Vb of the Periodic Table, preferably the chlorides, bromides, and oxychlorides of titanium, niobium, ziconium, and vanadium. The solution containing the particles is stirred, or otherwise agitated, for a sufficient period of time to break down clusters and to assure that all particle surfaces have been exposed to the catalytic solution. The particles are separated from the catalytic solution by filtering and partially dried at a reduced pressure, and treated at a temperature of about from 150° C. to about 200° C. for a sufficient period of time to assure a complete drying and removal of any excess catalyst solution from the surface of the individual particles.

The catalyst coated particles are then dispersed in a solvent containing an aluminum hydride compound and agitated for a sufficient period of time to assure that the surfaces of all the individual particles are exposed to the aluminum hydride solution. The particles are separated from the aluminum hydride solution, usually by filtering, air dried and then treated at a temperature sufficient to rapidly heat the whole body of particles to decompose the aluminum hydride compound as an aluminum plate on the particle surfaces. A temperature of from about 150° C. to about 200° C. is usually appropriate.

The actual agitation time required to assure that all the particle surfaces have been exposed to the catalyst and aluminum hydride compound solutions will depend on the quantity of particles to be coated. It has been found that the catalyzed particles can be stirred for a prolonged period of time in the aluminum hydride solution without loss of the catalytic effect. To assure a complete exposure of the surfaces to the catalyst solution and the aluminum hydride compound solution, it is preferred that the particles be stirred in the solution for a period of from about 15 minutes to about 20 minutes.

The length of time of heating the particles to remove excess catalyst solution is not usually critical, however, it is necessary to remove as much excess catalyst solution as possible prior to contacting the particles with an aluminum hydride compound solution. An excess of catalyst solution will cause a portion of the aluminum hydride compound to decompose, not in the form of a plate on the particle surfaces, but as a loose, non-adherent, aluminum debris in the final aluminum coated product.

The drying and decomposition temperature should be sufficient to assure a rapid heating of the entire mass of individual particles. Although the catalytic decomposition of aluminum hydride compounds readily takes place at a low temperature, because of the mass of particles and the heat sink produced, to assure that the plating temperature is realized an actual operating temperature of from about 150° C. to about 250° C. is usually employed and a temperature of about 200° C. is preferred for most particulate substrate materials.

The term "aluminum hydride" is used herein in its broad sense and is meant to include any hydride compound which contains at least one aluminum atom to which at least one hydrogen atom is directly bonded and includes both the solvated and non-solvated forms of these aluminum hydrides. Included, by way of example, are aluminum trihydride, the substituted aluminum hydrides such as those having the empirical formula $AlH_nX_{3-n}$ wherein X is a halogen, an —OR group or an —R group (wherein R is an alkyl, substituted alkyl, aryl or substituted aryl group) and $n$ has a numerical value equal to or less than 3. Also included are the complex aluminum hydrides such as $LiAlH_4$, $NaAlH_4$, $Mg(AlH_4)_2$ and the like, and complex substituted aluminum hydrides such as those having the empirical formula $M(AlH_mX_{4-m})_a$ wherein X has the definition given above, $m$ has a numerical value equal to or less than 4 and M is a metal or mixture of metals, preferably an alkali or alkaline earth metal, and $a$ has a numerical value equal to the valence of M. Of particular utility are the relatively simple aluminum hydrides containing at least two hydrogen atoms attached to the aluminum, e.g. $AlH_3$, $AlH_2Cl$, $AlH_2Br$, $LiAlH_4$, and the like. Mixtures of the various aluminum hydrides may also be employed.

In general, to achieve ease and uniformity of application, any solvent or mixture of solvents or suspending agents for the aluminum hydride compound may be employed which will not react with the aluminum hydride compound beyond the formation of a complex or solvate. Suitable solvents include aromatic hydrocarbons such as benzene, toluene and xylene, aliphatic hydrocarbons such as hexane, ethers, tertiary amines and the like. It is desirable to apply the aluminum hydride compound as a solution or suspension of from 0.1 molar to about 1.0 molar or more in aluminum hydride compound.

It is usually desirable for ease of application to employ the aluminum hydride in a solvated form. Compounds known to solvate or form complexes with the aluminum hydrides include ethers and other oxygen-containing organic compounds, and compounds containing a functional group such as a divalent sulfur atom, or trivalent nitrogen or trivalent phosphorus atom which is capable of allowing the solvation of an aluminum hydride with such compound. It is usually preferred that the solvate be an etherate and a wide variety of ethers containing from about 2 to about 20 carbon atoms are suitable. Usually the lower aliphatic ethers such as ethyl, propyl, or butyl ethers are employed but those containing an aromatic group such as methylphenyl ether, ethylphenyl ethers, propylphenyl ether or the alicyclic ethers such as tetrahydrofuran and the like may be employed.

If desired, such aluminum hydride compounds may be prepared in situ simultaneously with the plating step by employing aluminum hydride-forming reactants such as mixtures of lithium aluminum hydride and aluminum chloride, or sodium aluminum hydride and aluminum bromide, or the like. The presence of a metal halide such as $LiCl$, $MgCl_2$ or $AlCl_3$ together with the aluminum hydride is not detrimental to the plating reaction.

Due to the sensitivity of most aluminum hydrides to the presence of moist air, it is usually desirable that the application of the aluminum plate be conducted in a substantially anhydrous inert atmosphere.

Transition metal decomposition catalysts useful herein are compounds of the metals occurring in Groups IVb and Vb of the Periodic Table and mixtures thereof. It is preferable that the metal be in the form of a compound which is soluble to the extent of at least $1 \times 10^{-6}$ weight percent of the solvent employed. For example, such compounds as $TiBr_4$, $NbCl_5$, $VOCl_2$, $VOCl_3$, $$TiCl_4 \cdot 2[(C_2H_5)_2O]$$

$TiCl_4$, $TiBr_4$, $VCl_4$, $Ti(OC_2H_5)_2Cl_2$, $TiCl_2(i\text{-}OC_3H_7)_2$, $TiCl_2 \cdot 2[(C_2H_5)_2O]$, and $Ti(CH_4)_3 \cdot 2[(C_2H_5)_2O]$ have proved effective. The chlorides, bromides and oxychlorides of titanium, niobium, vanadium and zirconium generally seem to be more effective than the other compounds of Groups IVb and Vb transition metals and $TiCl_4$ has been found particularly effective.

Solvents for the transition metal decomposition catalysts are those normally liquid materials in which the catalyst is soluble to at least the extent of $1 \times 10^{-6}$ weight percent, which do not adversely effect the particulate substrate and which do not change the anion of the catalyst sufficiently to render it insoluble. Suitable solvents include non-reactive solvents such as benzene, hexane, and halogenated hydrocarbons, reactive solvents such as alcohols, aldehydes, ketones, mercaptans, carboxylic acids and mineral acids, and coordinating solvents such as ethers, nitriles, amides and amines.

A preferred plating system consists of about 0.02 molar $TiCl_4$ in hexane and a diethyl ether solution of $AlH_3$.

The transition metal decomposition catalyst is preferably applied to the particles surfaces prior to contact with the aluminum hydride solution. Preferably, the particles are agitated with a sufficient quantity of a relatively dilute solution of the catalyst to wet the entire surfaces of the particles. The solvent for the catalyst is then removed, e.g. by heating, leaving the catalyst substantially uniformly dispersed over the surface to be plated. Catalyst solutions at least about $1 \times 10^{-6}$ weight percent in decomposition catalyst, and preferably in concentrations of from about $5 \times 10^{-5}$ to about 100 weight percent of catalyst when applied to the particles provide sufficient catalyst to achieve plating of aluminum from the aluminum hydride compound. It has been found that uniformity of distribution of the catalyst on the particle surfaces has a significant effect on both the uniformity and thickness of the aluminum plate. It is, therefore, desirable to apply the catalyst to the particle surfaces in a manner which will assure relatively uniform distribution, such as, for example, as indicated previously, by stirring the particles in the catalyst solution.

Suitable particulate substrate materials are those which are stable at the previously indicated operating conditions and can be of various configuration and sizes. Elongated acicular crystal materials, commonly known as "whiskers,"

are especially adaptable to the novel coating method and include, for example, boron wire, glass fibers, $TiO_2$, titanium phosphate fibers, SiC, $Al_2O_3$, AlN, carbon, other metal nitride and metal fluoride whiskers. Microspheres and microballoons can also be plated by the novel method. Other particulate substrate materials, such as, for example, magnesium oxide crystals can be uniformly coated by employing the novel process as defined hereinbefore.

The thickness of the aluminum coating on the particles usually ranges from about 100 to about 200 angstroms.

The following examples facilitate a more complete understanding of the present invention. It is understood that they are included for illustrative purposes only and are not meant to limit the present invention to the specific embodiments incorporated therein.

Example 1

Twenty-five grams of SiC "whiskers" were slurried in 500 cc. of a hexane and $TiCl_4$ solution (approximately 0.02 molar with respect to $TiCl_4$).

The whiskers were stirred for 1.5 hours and then filtered.

They were air dried on a filter under a reduced pressure, and then dried in an oven at 220° C. for thirty minutes.

The hot crystals were slowly added to 400 cc. of a diethyl ether solution 0.2 M in aluminum trihydride. Upon complete addition they were allowed to stir for approximately five minutes.

After this period, the crystals were filtered, dried by vacuum and placed in a furnace and heated to 220° C. They were maintained at this temperature for about 20 minutes.

The "whiskers" were cooled and washed with 500 cc. of diethyl ether, filtered, and dried. An examination showed that a substantially uniform and continuous aluminum plate had been formed on the whiskers without any protrusions. The aluminum comprised from about 4.22 to about 4.44 weight percent of the final whiskers.

Example 2

In a nitrogen atmosphere one gram of silicon carbide "whiskers" (3 micron diameter) were stirred in 300 cc. of a hexane-$TiCl_4$ solution (approximately 0.02 molar in $TiCl_4$) for one-half hour.

They were filtered and dried with nitrogen, placed in a beaker and heated at 150° C. for about 2 hours. The so-treated crystals were slowly added to 200 cc. of 0.25 M aluminum trihydride diethyl ether solution. After stirring for fifteen minutes, they were filtered and dried at a reduced pressure. The dried whiskers were heated to 150° C. for 20 minutes and a continuous, uniform aluminum coating was formed. Analysis gave 8.77% and 8.84% by weight aluminum on the whiskers.

The same one gram sample of silicon carbide whiskers with the above aluminum coating removed by HCl soak were washed and dried in a vacuum oven.

These whiskers were then taken into a substantially anhydrous nitrogen atmosphere dry box and stirred in a catalyst solution containing 1.0 cc. of $TiCl_4$ and 100 cc. of hexane for 15 minutes. They were filtered and dried at 225° C. for about 30 minutes. The crystals were cooled to room temperature and slowly added to a 0.26 M solution of aluminum trihydride in diethyl ether. They were stirred for five minutes, filtered, suctioned dried and then heated at 225–250° C. for one hour. Analysis indicated a 9.6% by weight aluminum coating on the whiskers. This was observed as being a substantially uniform and adherent coating.

Example 3

One gram of $Al_2O_3$ single crystal sapphire whiskers, were plated by following the same operating procedure and conditions as described in Example 1.

Analysis of ten separate samples of the coated product gave 4.01% by weight aluminum. This was observed as being a substantially uniform coating with no protrusions. The analysis was made following a technique which had been demonstrated not to include aluminum in the form of the substrate, $Al_2O_3$.

Example 4

Several one-inch lengths of silicon carbide wire were plated by the same techniques and under the same operating conditions as employed in Example 1. The only difference was that all drying procedures were done with the wires standing on end and therefore they had a minimum of contact with the surface of the container. No analysis of coating weight was made because of the small size of sample. However, a substantially uniform aluminum coat was in evidence from visual observation and by the bright reflective surface of the wires after coating.

Example 5

Two grams of mixed whiskers of aluminum oxide-aluminum nitride ($Al_2O_3$-AlN) were plated by the same techniques and procedural steps as described in Example 1, and an aluminum coat was plated onto the whiskers. The coat was observed to be uniform and continuous in character with no aluminum protrusions extending from the surface of the whiskers.

Example 6

A sample of magnesium oxide crystals was slowly added to a stirring catalyst solution consisting of 750 ml. of naphtha and 3 cc. of $TiCl_4$. The crystals were stirred in the solution for approximately 15 minutes and then separated by filtering and then dried under a stream of nitrogen gas.

The dried catalyst coated crystals were then added to 600 ml. of a diethyl ether solution, 0.25 molar in aluminum trihydride, and stirred for about one minute.

The magnesium oxide crystals were then separated from the aluminum hydride solution by filtering and dried under a stream of nitrogen gas.

The dried crystals were then treated at a temperature of about 150° C. for 15 minutes. An examination of the crystals showed that a substantially uniform and continuous aluminum plate had been formed on the surface of the crystals without any protrusions. The aluminum coat comprised about 3.50 percent by weight of the coated magnesium oxide crystals.

Example 7

A sample of $TiO_2$ single crystals was added to a solution consisting of 250 ml. of naphtha and 2.5 cc. $TiCl_4$ with stirring. The crystals were stirred in the solution for approximately 15 minutes, separated by filtering and dried by passing a stream of nitrogen gas through them.

The dried catalyst coated crystals were then added to 350 ml. of a diethyl ether solution, 0.25 molar in aluminum trihydride, and stirred for about 1 minute.

The $TiO_2$ crystals were separated from the aluminum trihydride solution by filtering, dried under a stream of nitrogen gas and heated to a temperature of about 150° C. for 15 minutes.

An examination of the crystals showed that a substantially uniform aluminum plate had been formed on the crystals. The aluminum coat comprised from about 3.98 to about 4.92 weight percent of the individual crystals.

Other particulate substrate materials can be coated with a uniform plate of aluminum in the same manner as described in the foregoing examples. For example, silicon based glass microballoons, ranging in size from about 5 microns to about 5000 microns can be stirred in a solution of hexane, about 0.02 molar in $TiCl_4$, for about 15 minutes and then filtered and excess catalytic solution removed by heating the microballoons at a temperature of about 200° C. for 20 minutes. The catalyst treated microballoons then can be stirred in a solution of diethyl ether, about 0.2 molar in aluminum trihydride for about 5 minutes. The microballoons then can be removed from the aluminum trihydride solution and heated to a temperature of from about 150° C. to about 200° C. to produce a smooth, adherent, uniform metallic aluminum coat.

What is claimed is:

1. A process for coating the surface of individual particulate substrate materials which comprises subjecting the particles to the following steps and in a substantially anhydrous inert atmosphere:
    (a) agitating a body of individual particles in a solution containing a decomposition catalyst selected from the group consisting of compounds of the metals of Groups IVb and Vb of the Periodic Table and mixtures thereof;
    (b) removing excess catalyst from the surface of the particles;
    (c) agitating the catalyst-coated particles in a solution containing an aluminum hydride compound for a sufficient period of time to expose substantially the entire surface of all the particles to the aluminum hydride compound solution;
    (d) separating the particles from the aluminum hydride compound solution; and
    (e) heating the aluminum hydride-catalyst treated particles at a sufficient temperature to decompose the aluminum hydride compound forming an aluminum plate on the surface of the particles.

2. The process as defined in claim 1 wherein the surface of the particles are coated with the decomposition catalyst by dispersing the particles in a solution containing at least $1 \times 10^{-6}$ weight percent of the catalyst, with agitation, for a sufficient period of time to expose the entire surface of all the particles to the decomposition catalyst.

3. The process as defined in claim 1 wherein the excess decomposition catalyst solution is removed by heating the catalyst-coated particles at a sufficient temperature to dry the surface and remove excess catalyst from the surface of the particles.

4. The process as defined in claim 3 wherein the drying temperature is about 200° C.

5. The process as defined in claim 1 wherein the aluminum hydride-catalyst treated particles are heated at a temperature of from about 150° C. to about 200° C.

6. The process as defined in claim 1 wherein the aluminum hydride compound solution is about 0.1 to about 1 molar with respect to the aluminum hydride compound.

7. The process as defined in claim 1 wherein the solvent for said aluminum hydride compound is diethyl ether.

8. The process as defined in claim 1 wherein the aluminum hydride compound is selected from the group consisting of solvated and non-solvated, $AlH_3$, those aluminum hydrides having the general formula $AlH_nX_{3-n}$ wherein X is halogen, an —OR group or R group wherein R is an alkyl, substituted alkyl, aryl and substituted aryl group, and $n$ has a numerical value equal to or less than 3; complex aluminum hydrides having the empirical formula $M(AlH_mX_{4-m})_a$ wherein X is a halogen, or —OR or R group wherein R is an alkyl, substituted alkyl, aryl or substituted aryl, m has a numerical value equal to or less than 4, M is a metal or mixture of metals, and "a" has a numerical value equal to the valence of M.

9. The process of claim 1 wherein the decomposition catalyst is a member selected from the group consisting of $ZrCl_4$, $NbCl_5$, $VOCl_2$, $VOCl_3$, $TiCl_4 \cdot 2\text{-}[(C_2H_5)_2O]$, $TiCl_4$, $TiBr_4$, $VCl_4$, $Ti(OC_2H_5)_2Cl_2$, $TiCl_2(i\text{-}OC_3H_7)_2$, $$TiCl_2(i\text{-}OC_3H_7)_2, \quad TiCl_2 \cdot 2[(C_2H_5)_2O]$$

$Ti(BH_4)_3 \cdot [(C_2H_5)_2O]$ and mixtures thereof.

10. The process as defined in claim 1 wherein the particulate substrates are elongated acicular crystalline materials.

11. The process as defined in claim 10 wherein the elongated acicular crystalline materials are chosen from the group consisting of boron wire, glass fibers, $TiO_2$, titanium phosphate fibers, SiC, $Al_2O_3$, AlN, carbon fibers, metal nitride crystals, metal fluoride crystals and mixtures thereof.

12. The process as defined in claim 1 wherein the catalytic solution consists of about 0.02 molar $TiCl_4$ in hexane and wherein the aluminum hydride compound solution consists of $AlH_3$ in diethyl ether.

13. The process as defined in claim 1 wherein the particulate substrate consists of microspheres and microballoons.

References Cited

UNITED STATES PATENTS

| | | | |
|---|---|---|---|
| 2,599,978 | 6/1952 | Davis et al. | 117—100 X |
| 2,804,397 | 8/1957 | Goodman | 117—130 X |
| 3,041,197 | 6/1962 | Berger | 117—130 X |
| 3,136,798 | 6/1964 | Maginn | 117—107.2 X |
| 3,160,550 | 12/1964 | Novak et al. | 117—107.2 X |
| 3,164,448 | 1/1965 | Pottberg | 117—109 X |
| 3,206,326 | 9/1965 | Whaley et al. | 117—107.2 |
| 3,146,060 | 8/1964 | Canevari | 117—100 X |

FOREIGN PATENTS 915,385   1/1963   Great Britain.

WILLIAM D. MARTIN, Primary Examiner

MATHEW R. P. PERRONE, Assistant Examiner

U.S. Cl. X.R.

117—50, 54, 100, 126, 130, 160